United States Patent
Young

(10) Patent No.: US 7,909,255 B2
(45) Date of Patent: Mar. 22, 2011

(54) MOBILE INFORMATION RETRIEVAL OVER WIRELESS NETWORK

(75) Inventor: Johann Young, Kuala Lumpur (MY)

(73) Assignee: Nexbis SDN, BHD., Kuala Lumpur (MY)

( * ) Notice: Subject to any disclaimer, the term of this patent is extended or adjusted under 35 U.S.C. 154(b) by 152 days.

(21) Appl. No.: 12/026,828

(22) Filed: Feb. 6, 2008

(65) Prior Publication Data

US 2008/0203148 A1    Aug. 28, 2008

(30) Foreign Application Priority Data

Feb. 6, 2007  (MY) ................................ PI 20070169

(51) Int. Cl.
- G06K 7/10 (2006.01)
- G06K 15/00 (2006.01)
- G06K 7/00 (2006.01)

(52) U.S. Cl. ................ 235/462.13; 235/462.01; 235/440
(58) Field of Classification Search ............. 235/462.01, 235/462.1, 462.46, 462
See application file for complete search history.

(56) References Cited

U.S. PATENT DOCUMENTS

| | | | | |
|---|---|---|---|---|
| 5,334,822 A | * | 8/1994 | Sanford | 705/28 |
| 2004/0225887 A1 | * | 11/2004 | O'Neil et al. | 713/193 |
| 2005/0011957 A1 | * | 1/2005 | Attia et al. | 235/462.46 |
| 2005/0210499 A1 | * | 9/2005 | Shima | 725/8 |
| 2005/0286463 A1 | * | 12/2005 | Matsumoto | 370/328 |
| 2006/0011728 A1 | * | 1/2006 | Frantz et al. | 235/462.46 |
| 2006/0089126 A1 | * | 4/2006 | Frank et al. | 455/411 |
| 2007/0238505 A1 | * | 10/2007 | Okada | 463/16 |
| 2008/0004978 A1 | * | 1/2008 | Rothschild | 705/26 |
| 2008/0103850 A1 | * | 5/2008 | Shen | 705/7 |

FOREIGN PATENT DOCUMENTS

| | | |
|---|---|---|
| EP | 1 320 046 A | 6/2003 |
| WO | WO 2005/001628 A | 1/2005 |

OTHER PUBLICATIONS

Search Report mailed Mar. 25, 2009 from the European Patent Office in European Patent Application No. 072454835.7-1225 (9 pages).

* cited by examiner

Primary Examiner — Daniel A Hess
Assistant Examiner — Matthew Mikels
(74) Attorney, Agent, or Firm — Finnegan, Henderson, Farabow, Garrett & Dunner LLP

(57) ABSTRACT

The present invention relates to a system for mobile retrieval of information over a wireless or mobile network. Information to be retrieved is stored in packets or files in a remotely located server. Each packet of information is assigned a specific serial number, and the serial number is encoded into a coded image. A camera enabled mobile device is used to capture the coded image, then proceeds to decode the coded image into the serial number using an application pre-installed on the mobile device. The mobile device then transmits the serial number over a wireless network to the server where the information to be retrieved is stored. The server then processes the serial number and retrieves the information packet previously associated with this serial number from an internal database.

4 Claims, 1 Drawing Sheet

MOBILE INFORMATION RETRIEVAL OVER WIRELESS NETWORK

FIELD OF INVENTION

The present invention relates generally to a system for mobile retrieval of information over a wireless or mobile network.

BACKGROUND OF INVENTION

Currently, there are already various systems that enable information to be retrieved over a network. Many of these systems allow a user to scan a bar code or other coded image using a reader or other image capture device attached to a computer, decode the image data using software installed on the computer, then send the decoded image data over a computer network to a server where the information to be retrieved is stored in a database of other information. The server then sends the retrieved information back to the computer, which then displays it on a monitor.

In alternative systems, the information is not stored on the first server. The server only holds a list of web links or URLs (Uniform Resource Locator) associated with the decoded image data. Once the server identifies the correct URL it is sent back to the computer. The computer then uses the URL to access associated information over the Internet.

Increasingly so and across many different applications, it is desirable to use a similar information retrieval system with mobile devices. This provides the user with mobility while accessing information stored on a remote server, and effectively takes away the bulkiness of a computer.

SUMMARY OF THE INVENTION

The present invention provides a system for retrieving information over a wireless or mobile network, more specifically by using a camera-enabled mobile device to scan a coded image, send the decoded data of the image over a mobile network, the decoded data then providing access on a remote server of the information to be retrieved.

Another embodiment of the present invention is a system for retrieving information over a secured channel within a wireless network comprising:
1) an information verifying means comprising generating a plurality of coded images and associating each of said coded images to a unique information packet; and
2) an information accessing means comprising:
   a) loading an application onto a mobile device, said application able to at least partially control functioning of a camera and any connectivity ports located on the said mobile device, and said application having the capability to decode predefined coded images into predefined serial numbers assigned to those coded images;
   b) capturing an image of a coded image or other predefined coded image using the camera on said mobile device;
   c) decoding the predefined coded image into a predefined serial number which has been assigned to and is specific to the said predefined coded image;
   d) transmitting said serial number along with session information from said mobile device to a server over a wireless network;
   e) verifying, on the server, and with the use of said session information, the authenticity of the mobile device;
   f) accessing, on the server, information associated to the predefined serial number;
   g) transmitting the accessed information in (f) from the server to the said mobile device; and
   h) displaying the said accessed information on the said mobile device.

In yet another embodiment, the present invention is a method of accessing information stored on a remote server by using a camera enabled mobile device to capture an image of a coded image, decode the coded image into a serial number specific to the coded image using software installed on the mobile device, transmitting the serial number over a wireless network to a remote server, retrieving information stored on said server, said information associated with said serial number, transmitting retrieved information from said server to said mobile device.

DETAILED DESCRIPTION OF PREFERRED EMBODIMENTS

Figure 1:
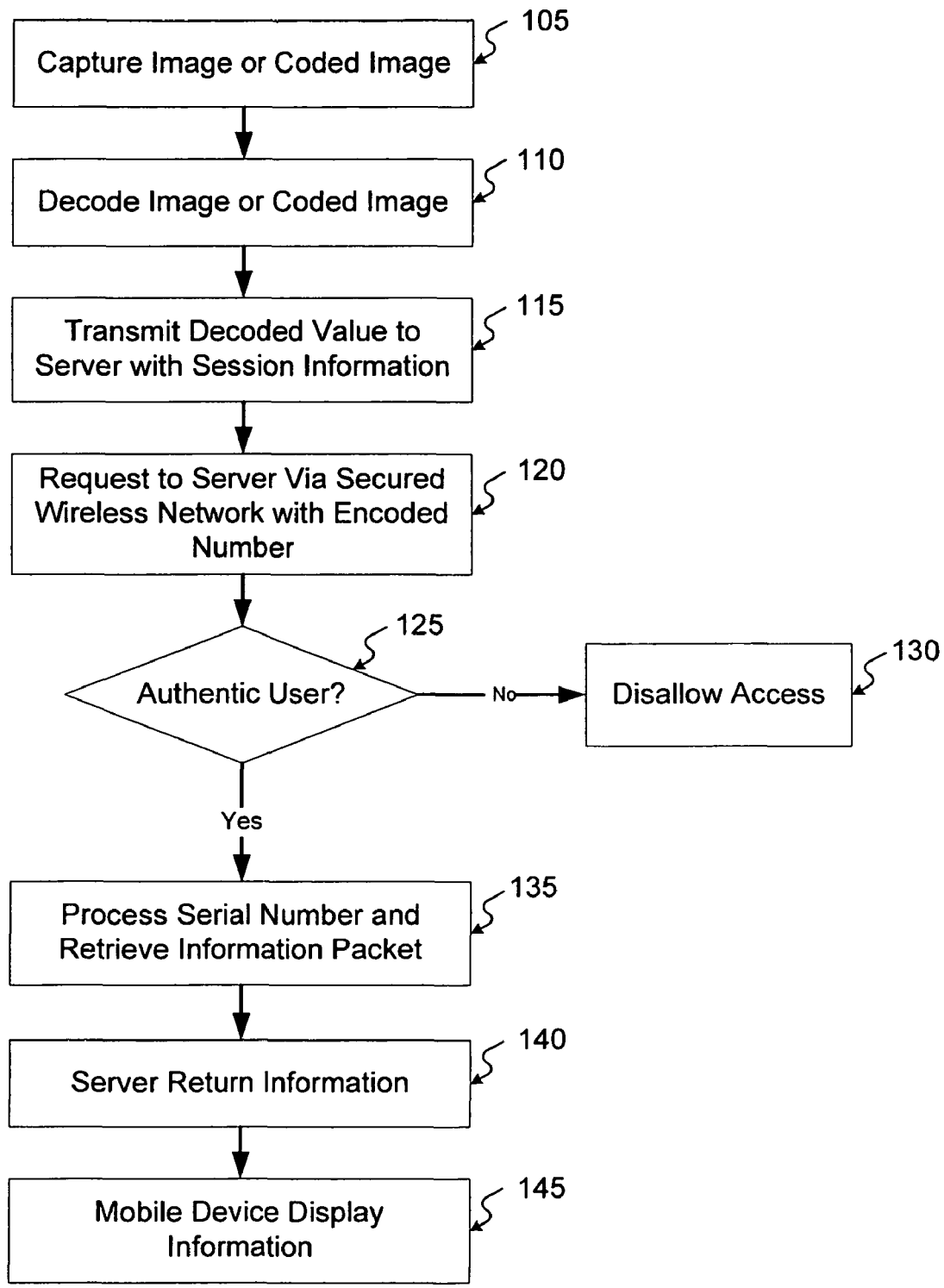
FIG. 1 is a flow diagram illustrating a system for mobile retrieval of information over a wireless or mobile network, according to certain disclosed embodiments.

With reference to FIG. 1, shown is a flow diagram depicting an exemplary embodiment of a system for mobile retrieval of information over a wireless or mobile network. In one embodiment, the present invention is a system for mobile retrieval of information over a wireless or mobile network. Information to be retrieved is stored in packets or files in a remotely located server. Each packet of information is assigned a specific serial number, and the serial number is encoded into a coded image or other coded image. In one exemplary embodiment, the information packet can be any digital representation of a document, audio recording, video recording or other information packet. A camera enabled mobile device is used to capture the image or coded image (step 105), then proceeds to decode the image or coded image into the serial number using an application pre-installed on the mobile device (step 110). In one exemplary embodiment, the coded image is either one of a one-dimensional barcode, two-dimensional barcode, or a combination of one- and two-dimensional barcode. The mobile device then transmits the serial number over a wireless network to the server where the information to be retrieved is stored (step 115). In one embodiment, the transmission of the serial number from the mobile device to the server includes session information, said session information comprising a description of the identity of the mobile device and/or other information such as the time the message is sent (step 120). In one embodiment, the application located on the mobile device is able to authenticate and allow access only to users who have a correct username and password and PIN (steps 125 and 130). The server then processes the serial number and retrieves the information packet previously associated with this serial number from an internal database (step 135). The destination server then returns the retrieved information to the requesting mobile handheld device (step 140), which then displays the information to a user (step 145).

In another embodiment, the present invention provides a system for retrieving information over a wireless or mobile network, more specifically by using a camera-enabled mobile device to scan a bar code or other image, send the decoded data of the image over a mobile network, the decoded data then providing access on a remote server of the information to be retrieved and incorporates an authentication process. This involves a session information being transmitted together with the serial number which session information is verified by the server as being authentic to the user transmitting the serial number.

In yet another embodiment, the present invention is a system for mobile retrieval of information over a wireless or mobile network. Information to be retrieved is stored in packets or files in a remotely located server. Each packet of information is assigned a specific serial number, and the serial number is encoded into a coded image. A camera enabled mobile device establishes a secure encrypted channel with the server, is used to capture the coded image, then proceeds to decode the coded image into the serial number using an application pre-installed on the mobile device. In one embodiment, the application located on the mobile device is able to authenticate and allow access only to users who have a correct username and password and PIN. The application on the mobile device then transmits the serial number using the secured channel to the server where the information to be retrieved is stored. The server then processes the serial number and retrieves the information packet previously associated with this serial number from an internal database. The destination server then returns the retrieved information to the requesting mobile handheld device, which then displays the information to a user.

A further embodiment of the present invention is a method for providing and performing identity and information authentication and verification which ultimately utilizes a mobile handheld device over a secured wireless connection comprising the steps of: generating unique coded images or identifying images which are consistently decipherable and decodable based on predefined algorithms and the application of the same to identity documents or uniquely identifiable parts/documents/products; associating the generated coded images to said information defined above; utilizing a mobile handheld device preinstalled with a specific application, program or software which controls the handheld device's camera and data connectivity ports; establishing a session between the mobile device and a predefined server on a computer network using the mobile data connection resident on the mobile handset device; at time of usage, the user uses the application which controls the handheld device's camera to capture an image of the unique coded image which is then processed and decoded into a unique serial number (which could comprise alpha numeric characters or any other form of characters); utilizing the secure encrypted channel to send this unique serial number and other session details to a predefined server on a computer network using the mobile data connection resident on the mobile handset device; verification by the destination server of the session information; information requested is presented in a fixed pre-defined format and with specific information fields always presented by the preinstalled application on the mobile handheld device.

It will be understood that the above description does not limit the invention to the above given details. It will be apparent to those skilled in the art that various changes and modifications may be made therein without departing from the spirit of the invention or from the scope of the appended claims.

What is claimed is:

1. A method for accessing information over a wireless network by utilizing a deployment process on a mobile device, the deployment process comprising:
   capturing, via a camera on the mobile device, a coded image;
   decoding the coded image into a unique serial number, wherein the unique serial number is assigned to both the coded image and a corresponding information packet, and wherein the corresponding information packet comprises session information having information of an identity of the mobile device and a time the unique serial number and the corresponding information packet are transmitted;
   transmitting the unique serial number along with the corresponding information packet from the mobile device to a server over the wireless network;
   receiving, from the server, information associated with the unique serial number after the server has verified authenticity of the mobile device using the corresponding information packet;
   displaying the received information on the mobile device.

2. The method for accessing information over the wireless network by utilizing the deployment process according to claim 1, the deployment process further comprising:
   authenticating a user of the mobile device via a secured login mechanism; and
   creating a secure encrypted channel within the wireless network for the transmittal of information.

3. A system for accessing information over a secured channel within a wireless network comprising:
   an information verifying means configured to generate a plurality of coded images and associate each of the plurality of coded images with a unique information packet; and
   an information accessing means configured to:
      capture, via a camera on a mobile device, a coded image;
      decode the coded image into a unique serial number, wherein the unique serial number is assigned to both the coded image and a corresponding information packet;
      transmit the unique serial number along with session information from the mobile device to a server over the wireless network, wherein the session information comprises information of an identity of the mobile device and a time the unique serial number and the corresponding information packet are transmitted;
      receive, from the server, information associated with the unique serial number after the server has verified authenticity of the mobile device using the corresponding information packet;
      display the received information on the mobile device.

4. The system for accessing information over the secured channel within the wireless network according to claim 3, wherein the information accessing means is further configured to:
   authenticate and allow access only to users who have at least one of a correct username and password and a correct PIN.

* * * * *

UNITED STATES PATENT AND TRADEMARK OFFICE
CERTIFICATE OF CORRECTION

| | | |
|---|---|---|
| PATENT NO. | : 7,909,255 B2 | Page 1 of 1 |
| APPLICATION NO. | : 12/026828 | |
| DATED | : March 22, 2011 | |
| INVENTOR(S) | : Johann Young | |

It is certified that error appears in the above-identified patent and that said Letters Patent is hereby corrected as shown below:

In the Claims:

Claim 1, column 4, line 21, insert --and-- after "packet;"

Claim 3, column 4, line 51, insert --and-- after "packet;"

Signed and Sealed this
Seventeenth Day of May, 2011

David J. Kappos
*Director of the United States Patent and Trademark Office*